United States Patent
Hogan et al.

(10) Patent No.: US 8,655,308 B2
(45) Date of Patent: Feb. 18, 2014

(54) METHOD AND SYSTEM FOR CHARGING CONTROL IN TELECOMMUNICATIONS SERVICES

(75) Inventors: Joe Hogan, Malahide (IE); Alan McNamee, Drumcondra (IE)

(73) Assignee: Openet Research Limited, Dublin (IE)

( * ) Notice: Subject to any disclaimer, the term of this patent is extended or adjusted under 35 U.S.C. 154(b) by 362 days.

(21) Appl. No.: 12/352,537

(22) Filed: Jan. 12, 2009

(65) Prior Publication Data

US 2010/0093336 A1 Apr. 15, 2010

(30) Foreign Application Priority Data

Oct. 13, 2008 (EP) .................................... 08017890
Oct. 13, 2008 (IE) .................................... 2008/0836

(51) Int. Cl.
*H04M 11/00* (2006.01)

(52) U.S. Cl.
USPC ........... 455/406; 455/407; 455/408; 455/409; 455/410; 455/411

(58) Field of Classification Search
None
See application file for complete search history.

(56) References Cited

U.S. PATENT DOCUMENTS

| | | | |
|---|---|---|---|
| 8,010,080 B1 * | 8/2011 | Thenthiruperai et al. | 455/406 |
| 2003/0232616 A1 * | 12/2003 | Gidron et al. | 455/406 |
| 2005/0044138 A1 * | 2/2005 | Albert et al. | 709/203 |
| 2007/0207818 A1 | 9/2007 | Rosenberg et al. | |
| 2007/0226775 A1 | 9/2007 | Andreason et al. | |
| 2007/0242816 A1 | 10/2007 | Cai et al. | |
| 2008/0014904 A1 | 1/2008 | Crimi et al. | |
| 2008/0034080 A1 | 2/2008 | Chamaraj et al. | |
| 2010/0132050 A1 | 5/2010 | Moore | |

FOREIGN PATENT DOCUMENTS

| | | |
|---|---|---|
| WO | 2004100384 A1 | 11/2004 |
| WO | W02004100384 A | 11/2004 |
| WO | 2007/103479 A2 | 9/2007 |

OTHER PUBLICATIONS

3GPP Support Office, "3GPP TS 23.125 V6.3.0., 3rd Generation Partnership Project; Technical Specification Grop Services and Systems Aspects; Overall high level functionality and architecture impacts of flowbased charging; Stage (Release 6)," France Dec. 2004.
Communication under Rule 71(3) EPC document; Application No. 08017890.8-2416; Mar. 29, 2010; Openet Research Limited.

* cited by examiner

*Primary Examiner* — Suhail Khan
(74) *Attorney, Agent, or Firm* — Æ ON Law; Adam L. K. Philipp

(57) ABSTRACT

A method for charging control in a communications network comprises, at a policy manager, responsive to a request for policy regulations for a subscriber, a stimulus is provided to a control system to trigger pre-emptive retrieval of subscriber information. At the control system, responsive to the stimulus, subscriber information is retrieved, information is stored in a cache, and responsive to receiving a request from a party, the information in cache is consulted and a response is provided to the party based on the consultation.

10 Claims, 3 Drawing Sheets

METHOD AND SYSTEM FOR CHARGING CONTROL IN TELECOMMUNICATIONS SERVICES

RELATED REFERENCES

This application claims priority to Irish Patent Application No. 2008/0836 filed Oct. 13, 2008, entitled "A Method And System For Charging Control In Telecommunications Services, which is hereby incorporated by reference in its entirety as if fully set forth herein; and to European Patent Application No. 08017890.8, filed Oct. 13, 2008 (now EP Patent No. 2175588, granted Jul. 29, 2010), also entitled "A Method and System for Charging Control in Telecommunications Services.

FIELD

The field relates to a method and system for charging control in telecommunications services.

BRIEF DESCRIPTION OF THE DRAWINGS

Illustrative embodiments will now be described, by way of example, with reference to the accompanying drawings, in which.

DESCRIPTION

Policy and charging control methods employed in various systems involve receiving connect requests for a subscriber from a gateway, querying a database to determine policy regulations associated with the subscriber, and provisioning the gateway with the policy regulations. Subsequently, upon receiving an authorisation request from the gateway to allow a subscriber to access an application, the method further involves querying a database to ascertain charging information associated with the subscriber, consulting the charging information to determine whether authorisation should be permitted or denied, and informing the gateway accordingly.

In many systems, a cache is provided for storing at least a portion of the charging information pertinent to the subscriber such that if a subsequent authorisation request is received on behalf of the subscriber, the cache may be queried as opposed to the database, thereby reducing the latency associated with the request.

For example, consider the case where the subscriber has a pre-paid credit account. On receipt of the policy regulations for the subscriber, the gateway requests authorisation for the subscriber to access an application. The system queries a database to determine charging information for the subscriber and determines that the subscriber has € 5 credit. Based on the application the subscriber wishes to access, for example, a text messaging facility, the system predicts that the subscriber is unlikely to spend in excess of € 0.50 and as such fills the cache with € 0.50. Subsequent authorisation requests are processed by accessing the cache to determine the credit available and deducting the amount accordingly. Only if the subscriber uses in excess of € 0.50 will the system need to query the database. In this way, the latency introduced by the authorisation requests is reduced.

Figure 1:
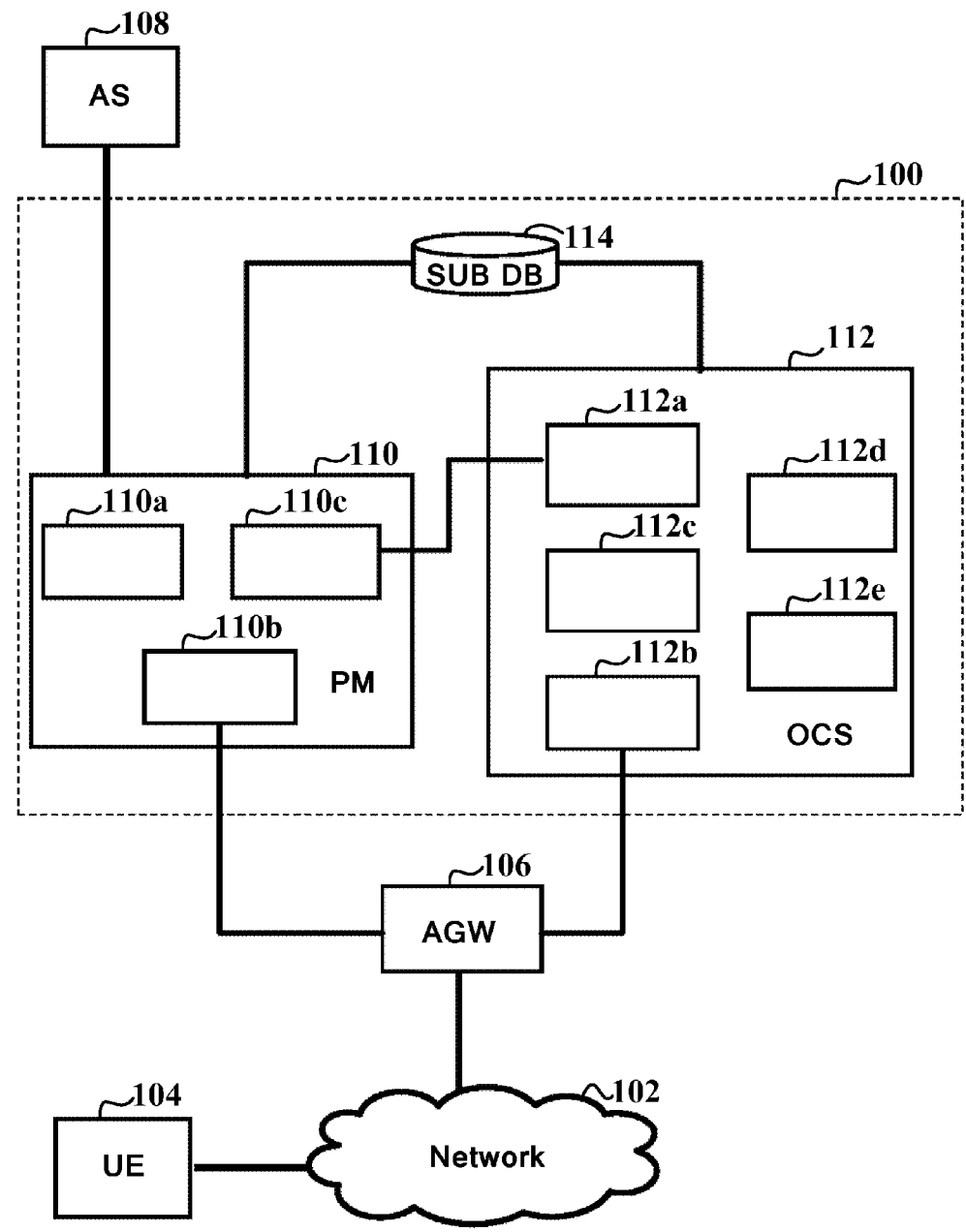
FIG. 1 illustrates a policy and charging control system according to one embodiment.

Referring to FIG. 1, there is illustrated a communications network comprising a policy and charging control system 100 according to one embodiment. The system 100 is arranged to allow users at a user terminal 104 to connect and access applications in accordance with subscriber policy and charging controls associated with the user or user terminal.

An access network 102 for example, 3GPP, 3GPP2, DOCSIS, or WiMAX is provided to connect a user at a terminal having IP enabled equipment 104, for example, a mobile phone, a PDA, a PC, or a set top box, to the network via an access gateway 106 to access applications provided by applications server 108.

As illustrated in FIG. 1, the system 100 comprises a policy manager 110 connected to a charging control system 112. In one embodiment, the policy manager 110 and charging control system 112 are connected to a subscriber database 114. However, in an alternative embodiment, instead of database 114 common to both the policy manager and the charging control system, the policy manager 110 is connected to a policy database and the charging control system 112 is connected to a charging database, the policy database being separate from the charging database.

The database 114 is an entity in an operator's charging domain and comprises subscriber related information required to personalise policy regulations. For example, the subscriber related information may comprise subscriber policy limitations such as roaming preferences, network preferences, content filtering, charging class, quality of service (QoS) attributes, permitted services and online charging control.

Where a subscriber's policy includes online charging control, the database 114 is further populated with information relating to the subscriber's charging limitations, for example, usage limitations for a given time period, spending limits for a given time period, prepaid credit balance, limitations of packages. However, in an alternative embodiment, information relating to the subscriber's charging limitations and requirements is stored in the charging control system 112 or in a charging database connected to the charging control system 112.

The policy manager 110 provides policy provisioning to the access gateway for a session instigated by a subscriber at the terminal. The policy manager 110 comprises a rules database 110a for storing policy regulations and a policy interface 110b to enable communication between the policy manager 110 and the access gateway 106 for the IP access network 102. The policy interface 110b may be implemented using Diameter, COPS, or RADIUS protocols. However, it will be appreciated that any suitable protocol may be employed.

In one embodiment, as illustrated in FIG. 1, a trigger interface 110c is provided to enable the policy manager 110 to trigger events to the charging control system 112.

Similarly, the charging control system 112 comprises a trigger interface 112a for enabling the charging control system 112 to receive events triggered by the policy manager 110, and for the charging control system 112 to acknowledge receipt of the triggered events.

In one embodiment, the trigger interface 112a and the trigger interface 110c are implemented using a Telco grade low latency protocol such as Diameter.

The charging control system 112 also comprises a charging interface 112b to enable communication between the charging system and the access gateway 106 for the IP access network 102. The charging interface 112b is implemented in one embodiment using Diameter, COPS, or RADIUS protocols. However, it will be appreciated that any suitable protocol may be employed.

The charging control system 112 further comprises a rating device 112d and balance manager 112e for enabling transaction management, rating and account balance management of subscriber balances and a cache 112c for storing information retrieved from the database 114 or the balance manager 112e.

In one embodiment, the triggered event supplied to the control system at trigger interface 112a comprises a subscriber identifier. However, it will be appreciated that the event may comprise any combination of the following data: a subscriber identifier, for example, IMSI, MSISDN, username; subscription ID; service information session information; billing information, online or offline; QoS profile information; and/or bearer information.

However, in one embodiment, on receipt of a triggered event at the trigger interface 112a from the policy manager 110, the cache 112c is populated pre-emptively with subscriber information retrieved from the database 114, or balance manager 112e, utilising a subscriber identifier decoded from the triggered event, thereby enhancing system performance and user experience by reducing an average latency associated with real time credit control during service deliveries. It will however be appreciated that the cache 112c may be pre-emptively populated with information in response to stimuli from any external device.

In one embodiment, the cache is pre-emptively loaded with the subscriber's account balance information. However, it will be appreciated that the cache may be loaded with any combination of the following information: a balance or set of balances associated with the subscriber obtained from the balance manager 112d or the database 114; a set of costs for the subscriber's services obtained from the rating component 112d; a set of tariffs for the subscriber's services obtained from the rating component 112d; subscriber related data obtained from the database 114.

Figure 2:
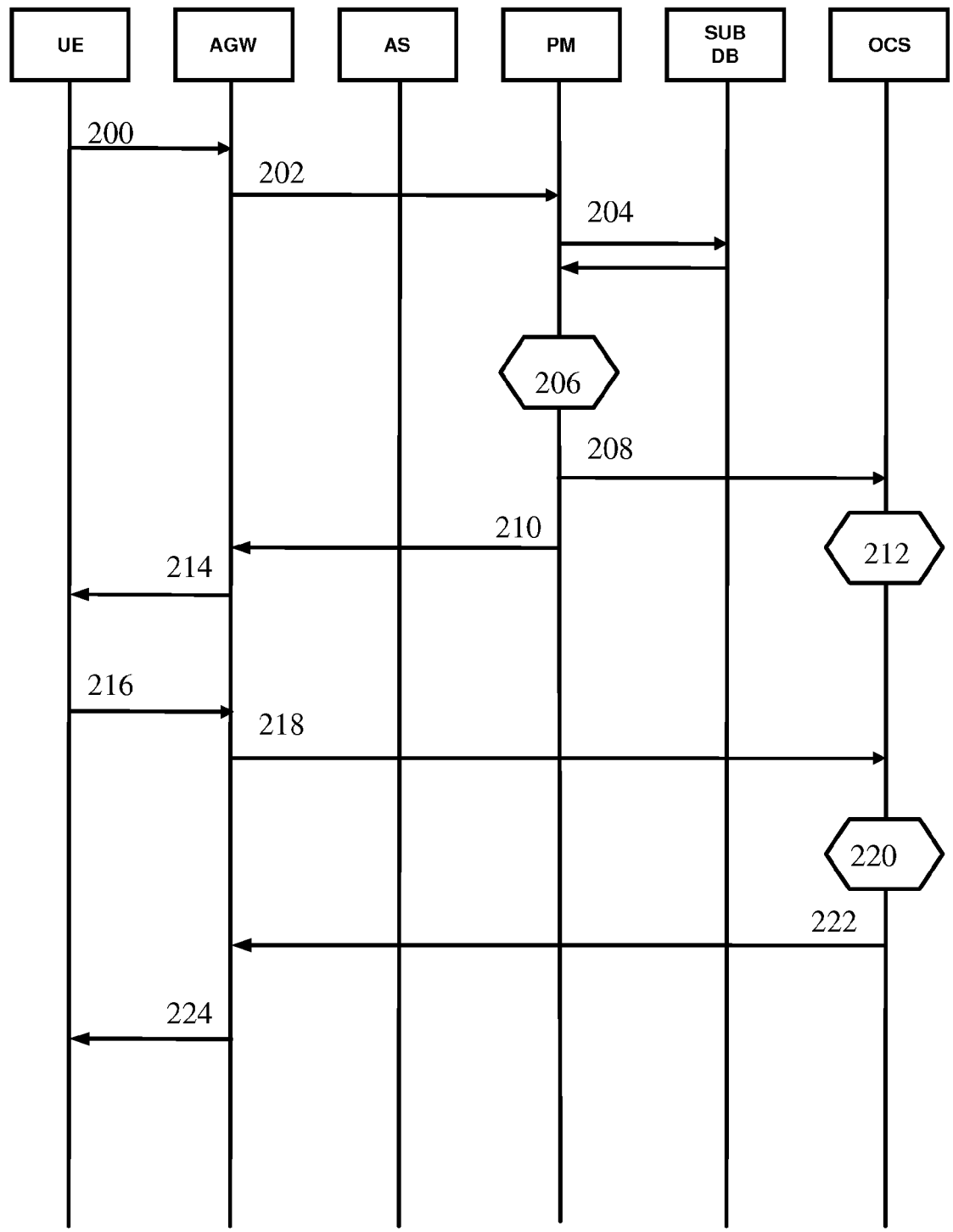
FIG. 2 illustrates an access gateway initiated message flow according to one embodiment.

Referring now to FIG. 2, there is illustrated an access gateway initiated message flow according to one embodiment.

A user at a terminal employs IP enabled user equipment (UE) 104 to connect to the network by sending 200 a connect request to the access gateway (AGW) 106. In one embodiment, the connect request comprises information identifying the subscriber associated with the user terminal, and a destination network to which the user wished to connect.

The access gateway 106 processes the request and requests 202 policy regulations for the subscriber associated with the terminal from the policy manager (PM) 110.

The policy manager 110 retrieves 204, policy information from the subscriber database (SUB DB) 114. In one embodiment, the policy information comprises an indication of whether an online charging control facility is applicable to the subscriber.

Based on the retrieved policy information, the policy manager 110 composes 206 policy regulations associated with the subscriber.

In one embodiment, if the policy information retrieved indicates that the online charging control facility is activated for the subscriber, an event is triggered 208 to the control system (OCS) 112. In one embodiment, the event triggered to the control system 112 comprises subscriber information and in particular, subscriber identification. However, it will be appreciated that in an alternative embodiment, an event is triggered to the control system 112 independently of whether the policy information retrieved comprises any indication regarding online charging control.

The policy manager 110 provides 210 the access gateway with the policy regulations relating to the subscriber.

In response to the event triggered by the policy manager 110, the control system 112 preemptively retrieves or prefetches charging information relating to the identified subscriber from the subscriber database 114 and stores 212 the charging information in cache 112c.

The access gateway 106 sends 214 a connect response to the user at the user equipment 104 indicating whether the request was permitted or denied.

If the connect request was permitted, the subscriber subsequently attempts to access a telecommunications service by sending 216 a service request to the access gateway 106.

In one embodiment, the access gateway 106 determines whether the online charging control facility is applicable to the subscriber and sends 218 an authorisation request to the charging system 112 to ascertain whether the service request is permitted. However, it will be appreciated that in an alternative embodiment, the access gateway 106 does not perform a determination in order to assess whether the subscriber is applicable for online charging control.

The control system 112 consults 220 the charging information relating to the subscriber stored in the cache 112c and processes the request.

The control system 112 then responds 222 to the access gateway 106 indicating that authorisation is permitted or denied.

The access gateway 106 then responds 224 accordingly to the user's service request.

Figure 3:
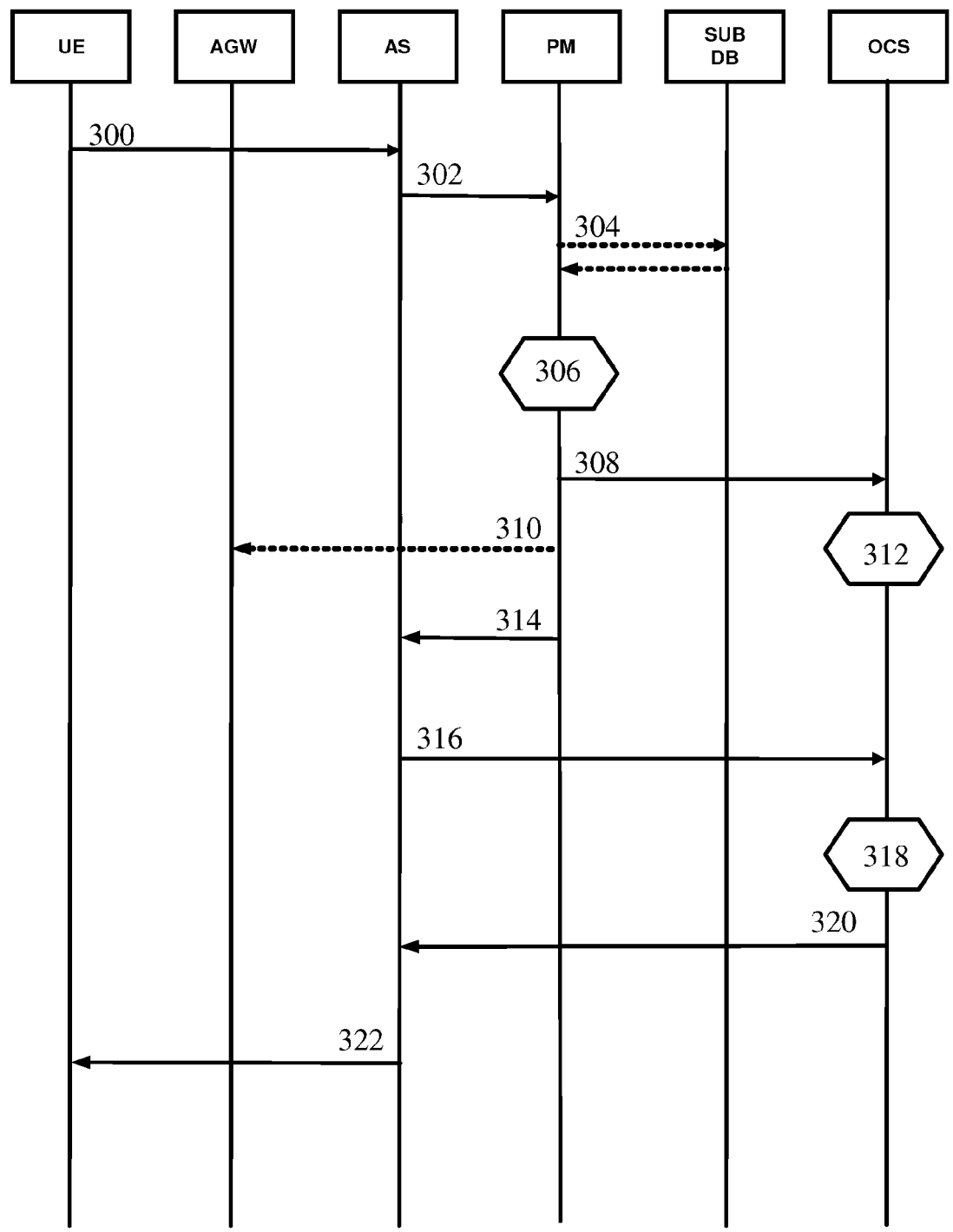
FIG. 3 illustrates an application server initiated message flow according to one embodiment.

Referring now to FIG. 3, there is illustrated an application server initiated message flow according to one embodiment.

The user at the terminal employs IP enabled user equipment 104 to send 300 an application start request to an application server (AS) 108 across the network in order to access an application. For example, the subscriber may wish to initiate a video conferencing session.

In response, the application server 108 triggers 302 a policy notification to the policy manager 112. For example, the policy notification may comprise a notification that a higher QoS is required in order to enable the video conferencing session.

In one embodiment, the policy manager 110 retrieves 304 policy information from the subscriber database 114, for example, to ascertain whether the subscriber is entitled to an improved QoS rating. However, it will be appreciated that this step is not essential to some embodiments.

The policy manager adapts 306 the policy regulations for the subscriber based on the policy notification received from the application server 108. In the above example, the policy regulations are adapted to associate the subscriber with a higher quality of service.

The policy manager triggers 308 an event to the control system 112 identifying the subscriber at the terminal.

Optionally, the policy manager 110 provides 310 the access gateway with the updated policy regulations relating to the subscriber.

In response to receipt of the event from the policy manager, the control system 112 preemptively loads 312 the cache 112c with information relating to the identified subscriber. In one embodiment, the information is pre-fetched from the database 114.

The policy manager acknowledges 314 the notification from the application server 108.

The application server 108 determines that online charging control is applicable to the subscriber and sends 316 an authorisation request to the control system 112.

The control system 112 processes 318 the request and sends 320 a response to the application server 108 indicating that authorisation is permitted or denied.

The access gateway 106 then responds 322 accordingly to the user's application start request.

The invention is not limited to the embodiment(s) described herein but can be amended or modified without departing from the scope of the present invention.

The invention claimed is:

1. A computer implemented method for charging control in a control system of a communications network, the control system comprising a policy manager and a charging system, the method comprising the steps of:
   at a policy manager,
      receiving a request for policy regulations for a subscriber,
   at the charging system,
      responsive to a stimulus, retrieving subscriber information; and
      storing said subscriber information in a cache;
   characterized by:
   at the policy manager,
      responsive to the request for policy regulations for the subscriber, providing the stimulus to the charging system to trigger the charging system to pre-emptively retrieve subscriber information in anticipation of the charging system receiving a subsequent authorization request for permission to provide a service to the subscriber; and
   at the charging system,
      receiving the subsequent authorization request for permission to provide the service to the subscriber,
      responsive to receiving the subsequent authorization request directly from an access gateway (AGW) or application server (AS), consulting said subscriber information in said cache to determine charging information; and
      providing a response to said AGW or AS based on said charging information.

2. The method of claim 1, wherein said providing a stimulus to the control system comprises sending a subscriber identifier to said charging system.

3. The method according to claim 2, wherein said step of retrieving subscriber information comprises pre-fetching charging information associated with the subscriber identifier from a database.

4. The method according to claim 3, further comprising the step of:
   at said policy manager,
      retrieving policy information from a database;
      composing policy regulations for said subscriber; and
      provisioning said policy regulations.

5. The method according to claim 4, further comprising the step of:
   at the policy manager,
      responsive to a notification from the AS, adapting said policy regulations associated with said subscriber.

6. The method according to claim 4, further comprising the step of:
   at the policy manager,
      responsive to a notification from the AS, querying said subscriber information;
      responsive to said notification complying with subscriber information, adapting said policy regulations accordingly.

7. The method of claim 6 wherein said policy information comprises roaming preferences, network preferences, content filtering, charging class, quality of service (QoS) attributes, permitted services and/or online charging control.

8. A control system for charging control in a communications network, the control system comprising:
   a policy manager; and
   a charging system comprising a cache;
   wherein the policy manager is arranged to receive a request for policy regulations for a subscriber; and
   wherein the charging system is arranged to retrieve subscriber information in response to a stimulus, and store said subscriber information in the cache, characterized in that:
   in response to the request for policy regulations for the subscriber, the policy manager is arranged to provide the stimulus to the charging system to trigger the charging system to pre-emptively retrieve subscriber information in anticipation of the control system receiving a subsequent authorization request for permission to provide a service to the subscriber; and
   wherein the control system receives the subsequent anticipated authorization request and in response to receipt of the subsequent anticipated authorization request directly from an access gateway (AGW) or applications server (AS), the control system is arranged to consult said subscriber information in said cache to determine charging information; and provide a response to said AGW or AS based on said consult.

9. The control system according to claim 8, wherein said charging system further comprises a balance manager arranged to manage an account balance associated with said subscriber.

10. The control system according to claim 9, further comprising a database in communication with said charging system and said policy manager and which is arranged to store subscriber information.

* * * * *